(12) United States Patent
Wang

(10) Patent No.: US 9,715,412 B2
(45) Date of Patent: Jul. 25, 2017

(54) SYSTEM AND METHOD FOR SUPPORTING SESSION MANAGEMENT IN A DISTRIBUTED TRANSACTIONAL SERVICE SYSTEM

(75) Inventor: Yu Wang, Beijing (CN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 652 days.

(21) Appl. No.: 13/072,526

(22) Filed: Mar. 25, 2011

(65) Prior Publication Data

US 2012/0246220 A1 Sep. 27, 2012

(51) Int. Cl.
*G06F 15/16* (2006.01)
*G06F 9/46* (2006.01)
*G06F 9/50* (2006.01)

(52) U.S. Cl.
CPC ............ *G06F 9/5033* (2013.01); *G06F 9/466* (2013.01); *G06F 2209/5016* (2013.01)

(58) Field of Classification Search
CPC  H04L 67/1008; H04L 67/327; H04L 67/1029
USPC ......................................... 709/203
See application file for complete search history.

(56) References Cited

U.S. PATENT DOCUMENTS

| | | | |
|---|---|---|---|
| 7,171,478 B2 * | 1/2007 | Lueckhoff et al. ............ | 709/227 |
| 2002/0116205 A1 * | 8/2002 | Ankireddipally et al. ....... | 705/1 |
| 2006/0155862 A1 * | 7/2006 | Kathi et al. .................... | 709/229 |
| 2007/0043842 A1 * | 2/2007 | Chouanard et al. .......... | 709/223 |
| 2009/0254909 A1 * | 10/2009 | Hanson et al. ................ | 718/102 |
| 2012/0324048 A1 * | 12/2012 | Mao et al. ..................... | 709/217 |

\* cited by examiner

*Primary Examiner* — Tonia L Dollinger
*Assistant Examiner* — Kishin G Belani
(74) *Attorney, Agent, or Firm* — Tucker Ellis LLP

(57) ABSTRACT

Session management can be supported in a distributed transactional service system using a distributed transactional server and an affinity client. The affinity client operates to receive a service request from a user application and invoke at least one distributed transactional service provided by the distributed transactional server. The distributed transactional server operates to create and maintain a session for the user application when the at least one distributed transactional service is invoked, and the distributed transactional server further operates to determine an affinity scope associated with the session. The affinity scope, which is maintained on the affinity client, defines a routing scope within the distributed transactional service system, into which consequent requests in the session from the user application are dispatched.

12 Claims, 3 Drawing Sheets

SYSTEM AND METHOD FOR SUPPORTING SESSION MANAGEMENT IN A DISTRIBUTED TRANSACTIONAL SERVICE SYSTEM

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention generally relates to transaction servers, and distributed transactional services, and particularly to supporting session management in a distributed transaction server or transactional service system.

BACKGROUND

Generally, a distributed transaction server, or a transactional services system, such as a Tuxedo server, can be considered a middleware platform that can be used to manage distributed transaction processing in a distributed computing environment. As an application server, the distributed transaction server can provide features such as containers to host business logic written in different programming languages. Additionally, the distributed transactional server can provide facilities to transparently distribute user applications across a cluster of machines, and to route and load balance requests both across different machines within a cluster, and across different servers within a machine. This in turn provides extremely high availability. These are the general types of environment that embodiments of the invention are intended to be used within.

SUMMARY

In accordance with an embodiment, session management can be supported in a distributed transactional service system using a distributed transactional server and an affinity client. The affinity client operates to receive a service request from a user application and invoke at least one distributed transactional service provided by the distributed transactional server. The distributed transactional server operates to create and maintain a session for the user application when the at least one distributed transactional service is invoked, and the distributed transactional server further operates to determine an affinity scope associated with the session. The affinity scope, which is maintained on the affinity client, defines a routing scope within the distributed transactional service system, into which consequent requests in the session from the user application are dispatched.

DETAILED DESCRIPTION

Figure 1:
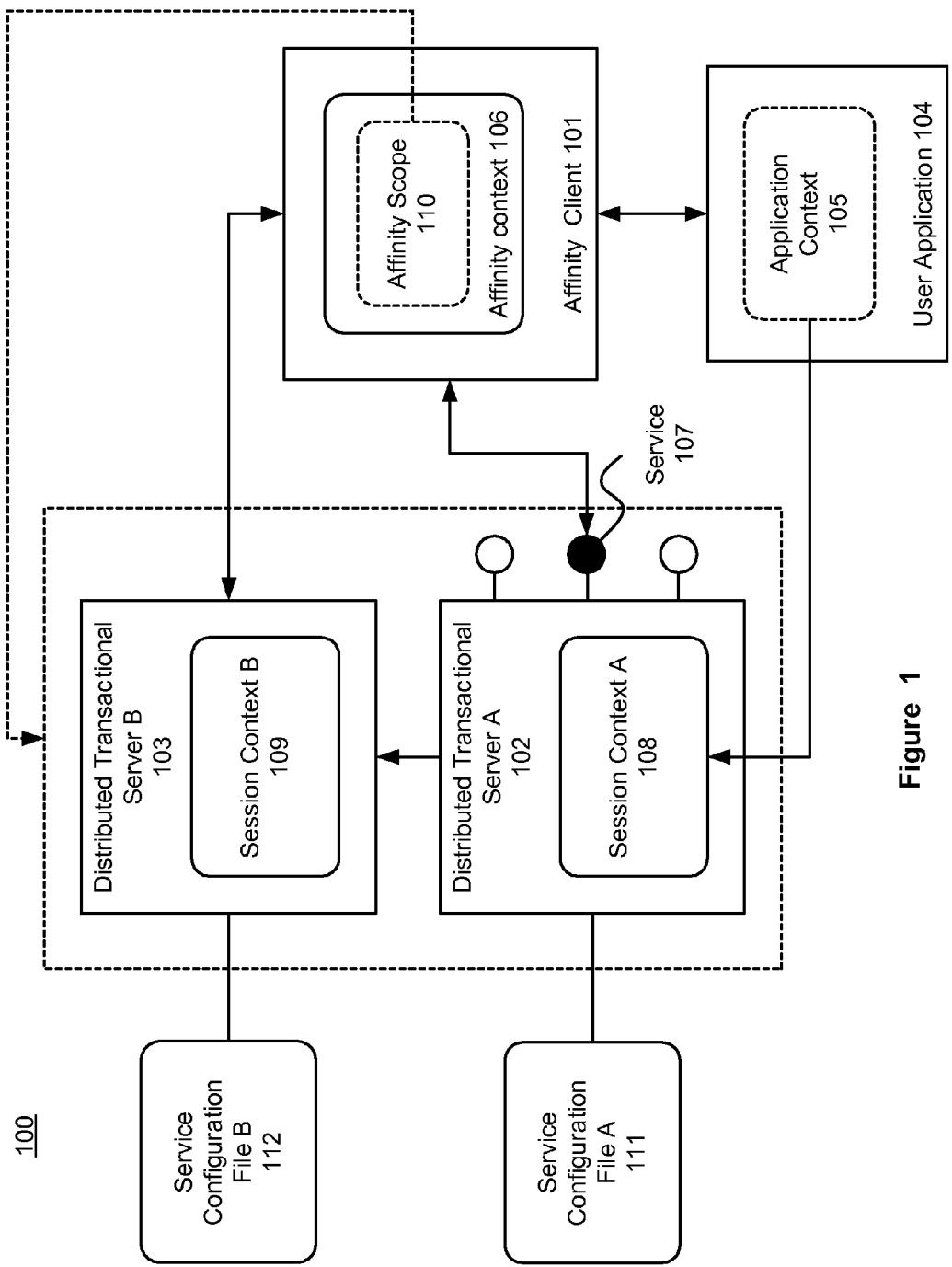
FIG. 1 illustrates an exemplary view of a distributed transactional service system that supports session management in accordance with an embodiment.

The present invention is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one.

Additionally, the description of various embodiments of the invention provided herein use a Tuxedo distributed transaction server or transactional services system environment as an illustrative example of a distributed transaction service environment. It will be apparent to those skilled in the art that other types of distributed transaction service environments can be used without limitation.

In accordance with an embodiment, an interface can be defined for communications, transactions, and management of data buffers in a distributed transaction service system. One example for such an interface is the Application-to-Transaction Monitor Interface (ATMI) interface for use with the ORACLE Tuxedo system. The ATMI interface provides the connection between application programs and the Tuxedo system.

The Tuxedo system provides different ATMI communication paradigms to application developers. One ATMI communication paradigm is the request/response communication paradigm, which can also be referred to as client/server interaction. The Tuxedo system enables a client to send a request to a server and wait for a response. The Tuxedo ATMI client is a software module that collects a user request and forwards it to a server that offers the requested service. A software module can become a Tuxedo client by calling the ATMI client initialization routine and connect to a Tuxedo server, so that the client can then exchange information with the server. Also, the client can call the ATMI termination routine to leave the application and to notify the Tuxedo system that it no longer needs to be tracked. Then, the application resources on the Tuxedo server can be made available for other operations.

In accordance with an embodiment, there is no session management in the request/response communication paradigm, since every ATMI request is dispatched independently. The request/response communication paradigm can be synchronous, or asynchronous. In the synchronous mode, the processing waits until the requester receives the response. In the asynchronous mode, the processing continues while the requester waits for the response.

Another ATMI communication paradigm is the conversational communication paradigm, which is similar to request/response communication except that multiple requests and/or responses can take place before the conversation is terminated. With conversational communication, both the client and the server maintain state information until the conversation is disconnected. The server process in the conversational communication paradigm is occupied exclusively during a conversation communication. An application protocol can govern how messages are communicated between the client and server. The conversational communication is commonly used to buffer portions of a lengthy response from a server to a client.

In accordance with an embodiment, a client/sever affinity feature can be supported in a distributed transactional service system, such as the Tuxedo system. The distributed transactional service infrastructure can maintain a virtual request routing scope and establish a session. The distributed transactional server in the client/sever affinity can be used in a multiplex manner. The user applications can retain their session context and states among multiple distributed transactional services. Once a session is initiated, all subsequent calls in a session are impacted by the routing scope until the session is terminated explicitly or implicitly.

In accordance with an embodiment, session management can be supported in a distributed transactional service system using a distributed transactional server and an affinity client. The affinity client operates to receive a service request from a user application and invoke at least one distributed transactional service provided by the distributed transactional server. The distributed transactional server operates to create and maintain a session for the user application when the at least one distributed transactional service is invoked, and the distributed transactional server further operates to determine an affinity scope associated with the session. The affinity scope, which is maintained on the affinity client, defines a routing scope within the distributed transactional service system, into which consequent requests in the session from the user application are dispatched.

FIG. 1 illustrates an exemplary view of a distributed transactional service system that supports session management in accordance with an embodiment. As shown in FIG. 1, the distributed transactional service system 100 includes an affinity client 101 and an affinity server, which can be a distributed transactional server 102 such as a Tuxedo server. The affinity client can invoke a distributed transactional service 107 provided by the distributed transactional server once the affinity client receives a service request from a user application 104. When the distributed transactional service is invoked, the distributed transactional server can then create a session and session context 108 associated with the session for the user application. Also, the application can maintain additional application context 105 if necessary.

In accordance with an embodiment, as part of the process to initiate a session, the distributed transactional server can determine an affinity scope 110 associated with the session. The affinity scope, which is maintained on the affinity client as part of an affinity context 106, defines a routing scope within the distributed transactional service system, into which subsequent requests in the session from the user application are dispatched.

Different affinity scopes can be defined for a session. For example, in the case when the distributed transactional server is the Tuxedo system, the system can define affinity scopes at the levels of machine, group, and server. The machine affinity scope limits the session in a specific Tuxedo machine in which the service is invoked. The group affinity scope limits the session in a specific Tuxedo group in which the service is invoked. The server affinity scope limits the session in a specific Tuxedo server in which the service is invoked.

In accordance with an embodiment, the session is also associated with an affinity strictness level that defines how the subsequent requests can be dispatched in the distributed transactional service system.

For example, the server can define a session with a mandatory strictness level that honors mandatory affinity scope, which indicates that all subsequent requests in the session are dispatched to service entries in the mandatory affinity scope until the session is closed explicitly or implicitly. If no service entries in the scope can be found, the system allows the request to fail.

In another example, the server can define a session with a precedent strictness level that honors precedent affinity scope, which indicates that all subsequent requests in the session are dispatched to service entries in the precedent affinity scope until the session is closed explicitly or implicitly. If no service entries in this scope can be found, the system can try to dispatch the request out of scope. For example, in the Tuxedo environment, when all candidate service entries were cleared from bulletin board after the session started due to unexpected termination of ATMI services, the request can be dispatched to service entries out of the current affinity scope. Additionally, users can use precedent affinity scope to implement failover.

In accordance with an embodiment, the system allows users to check the user session id or token generated and maintained by the application for more specific control, such as in the case when some service requests are not allowed to be dispatched into service entries out of scope but precedent affinity scope is used.

In accordance with an embodiment, the distributed transactional service can forward the service request to another distributed transactional service residing in another distributed transactional server 103. The second distributed transactional server can determine a different affinity scope and create and maintain a separate session contexts 109 for the session. Also, as shown in FIG. 1, the second distributed transactional server can communicate with the affinity client directly.

In accordance with an embodiment, users can maintain their own server-side session context in the affinity scope among multiple distributed transactional services. The server-side session context of users can include session information such as database cursor and routing information. The transactional service infrastructure does not intervene with user session context management.

In accordance with an embodiment, users can configure different session roles for different distributed transactional services from the distributed transactional server side. A service configuration file 111 associated with the distributed transactional server can be used to specify different session roles for each distributed transactional service provided by the distributed transactional server. At runtime, the distributed transactional server can associate a session role defined in the service configuration file with a corresponding distributed transactional service.

For example, different session roles can be defined in the Tuxedo system, such as BEGIN, END and NONE. A new session can be initiated when an affinity client that is not involved in a session calls a service with BEGIN role. Correspondently, affinity context associated with the new session can be created from the affinity client side.

In the Tuxedo environment, a service with a BEGIN role can be called by tpcall or trpcall without TPNOREPLY flag. The affinity clients are not aware of the session until the reply message is received from the distributed transactional server side. In other words, all subsequent requests can be dispatched without affinity impact until the response message is received.

When an affinity client that has been involved in a session calls a service with END role, the session can be terminated and the corresponding affinity context on the client side can be cleared. In Tuxedo, the affinity clients are not aware of the session termination until the reply message is received from the distributed transactional server.

In accordance with an embodiment, if the distributed transactional server forwards or redirects a service request to another distributed transactional server, another service configuration file 112 associated with the second distributed transactional server can be used to define the session roles.

Figure 2:
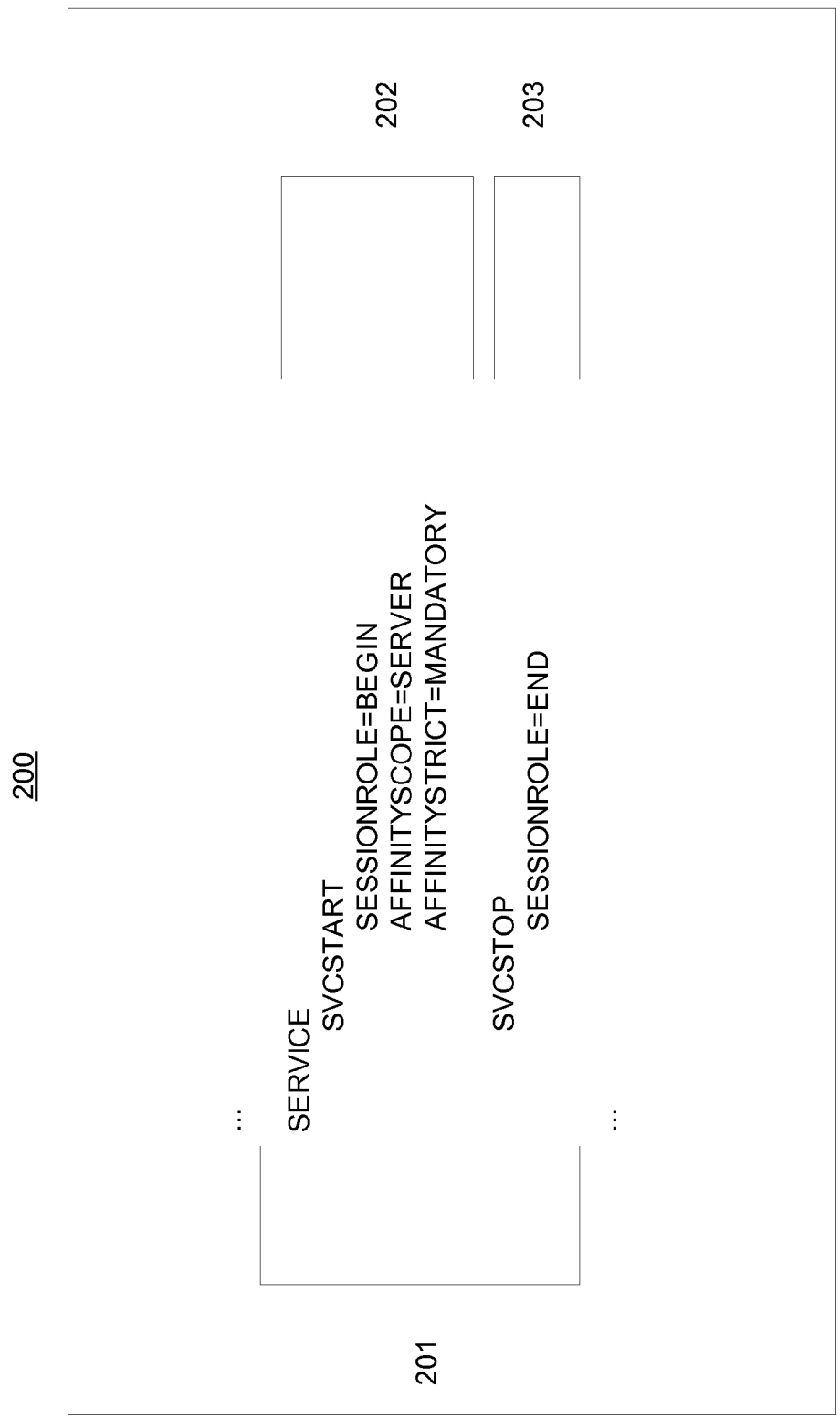
FIG. 2 illustrates an exemplary service configuration file that defines different session role in accordance with an embodiment.

FIG. 2 illustrates an exemplary service configuration file that defines different distributed transaction services with session role in accordance with an embodiment. As shown in FIG. 2, the exemplary service configuration file 200 includes a SERVIE section 201 that defines two services: a SVCSTSTART service 202 and a SVCSTOP service 203.

The SVCSTSTART service definition includes a parameter of SESSIONROLE with a value of BEGIN. At runtime, when the SVCSTSTART service is invoked by an affinity client, the distributed transactional server, or the affinity server, can initiate a session. Additionally, the AFFINITY-SCOPE parameter in the service definition has a value of SERVER and the AFFINITYSTRICT parameter in the service definition has a value of MANDATORY. Hence, all subsequent calls in the session are restricted to service entries within the server that initiate the session.

The SVCSTOP service definition includes a parameter of SESSIONROLE with a value of END. At runtime, when the SVCSTOP service is invoked by the affinity client, the distributed transactional server can stop the session.

In accordance with an embodiment, a session can be initiated from different client types, such as a native client, a workstation client, a JOLT client, or an ATMI server. Additionally, the request can be directed from a remote domain, such as from an ATMI server or a client in the remote domain.

In accordance with an embodiment, the system implements a routing precedence that takes into consideration of different types of routing concerns. For example, in the Tuxedo environment, the system first directs the service request to a server using a transaction precedence routing in GWTDOMAIN. Then, the system directs the service request to a server determined by routing for transaction affinity with database instances. The client/server affinity routing has a priority over the load balancing according to service load, and the load-balancing mechanism takes effect within a specific affinity scope if enabled.

In accordance with an embodiment, the distributed transactional service can call a different service in the distributed transactional service system and include the different service in the session. For example, in the Tuxedo system, a service with NONE role that is involved in affinity session can propagate the session into other services called by them. If no service entries in the specific affinity scope can be found, the session information won't be propagated into the requested service entries out of scope. On the other hand, the services with BEGIN and END role do not propagate the session. Also, the session propagation does not cross the domain boundary in the Tuxedo system, if only machine, group, and server level affinity scope are supported.

In accordance with an embodiment, distributed transactional service system supports a nested session in the session. A nested session can be a session, which has an affinity scope that is within the affinity scope of the parent session.

In accordance with an embodiment, when the session is terminated, the affinity context on the client side are cleared, and the user can release session resources such as a database cursor on the distributed transactional server. For example, in Tuxedo, sessions are terminated explicitly if services with END role in the specific affinity scope are invoked. On the other hand, the session can terminate implicitly, if the affinity client invokes tpterm, or the ATMI service as affinity client invokes tpreturn, or the affinity client terminates unexpectedly. In the case when session terminated implicitly, users can implement mechanisms such timeout to release session resource in the user application.

Figure 3:
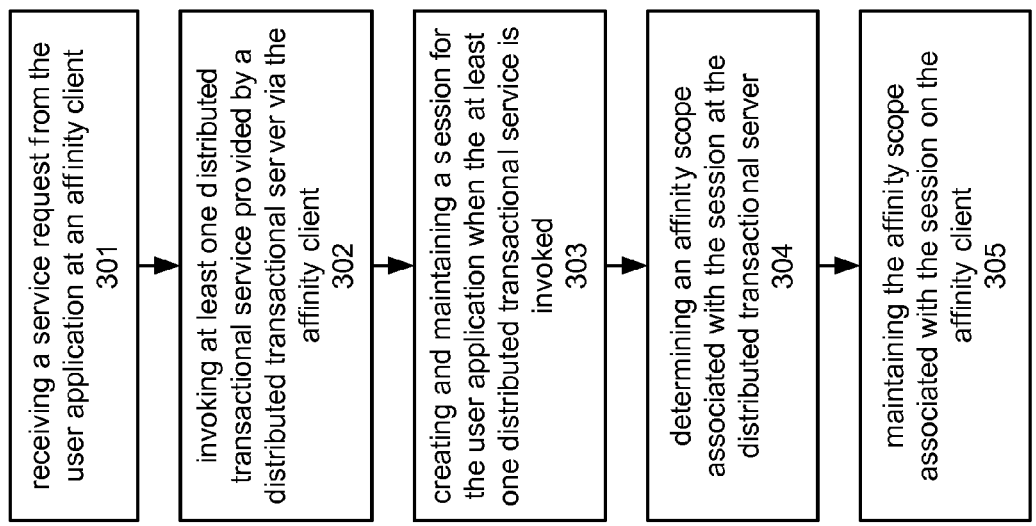
FIG. 3 illustrates an exemplary flow chart for supporting session management in a distributed transactional service system in accordance with an embodiment.

FIG. 3 illustrates an exemplary flow chart for supporting session management in a distributed transactional service system in accordance with an embodiment. As shown in FIG. 3, the affinity client receives a service request from a user application at step 301. Then, the affinity client invokes at least one distributed transactional service provided by a distributed transactional server at step 302. The distributed transactional server creates and maintains a session for the user application when the at least one distributed transactional service is invoked at step 303. The distributed transactional server determines an affinity scope associated with the session at the distributed transactional server at step 304. The affinity client maintains the affinity scope associated with the session on the affinity client at step 305.

The present invention may be conveniently implemented using a conventional general purpose or a specialized digital computer or microprocessor programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The code examples given are presented for purposes of illustration. It will be evident that the techniques described herein may be applied using other code languages, and with different code.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system to support session management in a distributed transactional service system, comprising:
   a first distributed transactional server and a second distributed transactional server, wherein the first distributed transactional server provides a first distributed transactional service, and wherein the second distributed transactional server provides a second distributed transactional service; and
   an affinity client that operates to receive a service request from a user application and invoke the first distributed transactional service provided by the first distributed transactional server;
   wherein the first distributed transactional server operates to:

create and maintain a server-side session, including a first session context, for use by the user application when the first distributed transactional service is invoked by the affinity client as part of a session;

determine a first affinity scope associated with the server-side session, wherein the first affinity scope limits the level of access to the first service across the first distributed transactional server, and wherein the first affinity scope defines, and includes, a first routing scope within the distributed transactional service system into which subsequent service requests within the server-side session, and from the user application to the affinity client, are routed;

communicate the first affinity scope to the affinity client; and forward the service request to the second distributed transactional service provided by the second distributed transactional server;

wherein, in response to receiving the forwarded service request from the first distributed transactional server, the second distributed transactional server operates to:

create and maintain a second session context for the server-side session associated with the second distributed transactional service;

determine a second affinity scope, wherein the second affinity scope limits the level of access to the second distributed transactional service at least within the limits of the first affinity scope; and communicate the second affinity scope to the affinity client; and wherein the affinity client operates to maintain the first affinity scope associated with the session, for use by the user application in dispatching the subsequent requests into the routing scope, and maintain the second affinity scope associated with the session.

2. The system according to claim 1, wherein:
the first distributed transactional server operates to determine a life cycle for the session.

3. The system according to claim 1, wherein:
the first distributed transactional server provides another distributed transactional service, and wherein the first distributed transactional server operates to end the session for the user application when the another distributed transactional service is invoked.

4. The system according to claim 1, wherein:
the first distributed transactional server operates to associate a session role with the first distributed transactional service, and wherein the session role is defined in a service configuration file associated with the distributed transactional server.

5. The system according to claim 1, further comprising:
the first distributed transactional server is in a distributed transactional service domain, and the affinity client is in a different distributed transactional service domain.

6. The system according to claim 1, wherein:
the distributed transactional service system supports a nested session in the session.

7. A method for supporting session management in a distributed transactional service system, comprising:

receiving a service request from a user application at an affinity client;

invoking a first distributed transactional service provided by a first distributed transactional server via the affinity client;

creating and maintaining, by the first distributed transactional server, a server-side session, including a first session context, for use by the user application when the first distributed transactional service is invoked by the affinity client as part of a session;

determining, by the first distributed transactional server, a first affinity scope associated with the server-side session, wherein the first affinity scope limits the level of access to the first service across the first distributed transactional server, and wherein the first affinity scope defines, and includes, a first routing scope within the distributed transactional service system into which subsequent service requests within the server-side session, and from the user application to the affinity client, are routed;

communicating the first affinity scope to the affinity client;

forwarding, by the first distributed transactional service, the service request to a second distributed transactional service provided by a second distributed transactional server;

creating and maintaining, by the second distributed transactional server, and in response to receiving the forwarded service request from the first distributed transactional server, a second session context for the server-side session associated with the second distributed transactional service;

determining, by the second distributed transactional server, a second affinity scope, wherein the second affinity scope limits the level of access to the second distributed transactional service at least within the limits of the first affinity scope;

communicating the second affinity scope to the affinity client;

maintaining the first affinity scope associated with the session on the affinity client, for use by the user application in dispatching the subsequent requests into the routing scope; and maintaining the second affinity scope on the affinity client.

8. The method according to claim 7, further comprising:
determining, by the first distributed transactional server, a life cycle for the session.

9. The method according to claim 7, further comprising:
providing, by the first distributed transactional server, another distributed transactional service, wherein the distributed transactional server operates to end the session for the user application when the another distributed transactional service is invoked.

10. The method according to claim 7, further comprising:
associating, by the first distributed transactional server, a session role with the first distributed transactional service, wherein the session role is defined in a service configuration file associated with the distributed transactional server.

11. The method according to claim 7, further comprising:
allowing the distributed transactional server to be in a distributed transactional service domain, and the affinity client to be in a different distributed transactional service domain, and allowing the distributed transactional service system to support a nested session in the session.

12. A non-transitory machine readable medium having instructions stored thereon that when executed cause a system to perform the steps comprising:

receiving a service request from a user application at an affinity client;

invoking a first distributed transactional service provided by a first distributed transactional server via the affinity client;

creating and maintaining, by the first distributed transactional server, a server-side session, including a first session context, for use by the user application when the first distributed transactional service is invoked by the affinity client as part of a session;

determining, by the first distributed transactional server, a first affinity scope associated with the server-side session, wherein the first affinity scope limits the level of access to the first service across the first distributed transactional server, and wherein the first affinity scope defines, and includes, a first routing scope within the distributed transactional service system into which subsequent service requests within the server-side session, and from the user application to the affinity client, are routed;

communicating the first affinity scope to the affinity client;

forwarding, by the first distributed transactional service, the service request to a second distributed transactional service provided by a second distributed transactional server;

creating and maintaining, by the second distributed transactional server, and in response to receiving the forwarded service request from the first distributed transactional server, a second session context for the server-side session associated with the second distributed transactional service;

determining, by the second distributed transactional server, a second affinity scope, wherein the second affinity scope limits the level of access to the second distributed transactional service at least within the limits of the first affinity scope;

communicating the second affinity scope to the affinity client;

maintaining the first affinity scope associated with the session on the affinity client, for use by the user application in dispatching the subsequent requests into the routing scope; and maintaining the second affinity scope on the affinity client.

* * * * *